Patented Oct. 25, 1938

2,134,035

UNITED STATES PATENT OFFICE 2,134,035

PYRAZOLONE AZO DYESTUFFS

George Holland Ellis, Spondon, near Derby, England, assignor to Celanese Corporation of America, a corporation of Delaware No Drawing. Application January 6, 1936, Serial No. 57,767. In Great Britain January 9, 1930

4 Claims. (Cl. 260—162)

This application is a continuation-in-part of U. S. application S. No. 535,296 filed May 5th, 1931, which is a continuation-in-part of U. S. application S. No. 500,428 filed December 5th, 1930. It relates to a new class of azo dyes, and to processes for the production of the same.

The new dyes of the invention contain a pyrazolone residue linked through an azo group to an aromatic residue containing a hydroxy group in the para position to the azo group. The pyrazolone nucleus is preferably that of a 1-phenyl-3-methyl-5-pyrazolone or other 1-aryl-3-methyl-5-pyrazolone. A particularly useful dyestuff is p-hydroxybenzene-azo-1-phenyl-3-methyl-5-pyrazolone.

The dyestuffs of the invention exhibit a remarkable fastness to light and to the action of reducing agents such as stannous chloride, which are commonly employed in the production of reduction discharges. For this reason the dyestuffs are of great utility in the production of illuminated or coloured discharge effects. The dyestuffs, and particularly the unsulphonated members of the class, have a good affinity for cellulose acetate and other organic derivatives of cellulose. The term organic derivative of cellulose is intended to connote ethers and organic esters of cellulose, e. g. ethyl, methyl and benzyl cellulose and cellulose formate, propionate and butyrate.

The dyestuffs may be produced by any suitable means, for example by coupling a pyrazolone coupling component with a diazo compound containing a hydroxy group in the para position to the diazo group. Para-hydroxy-benzene-azo-1-phenyl-3-methyl-5-pyrazolone may be produced by diazotising p-amino-phenol and coupling with 1-phenyl-3-methyl-5-pyrazolone. This dyestuff colours cellulose acetate in golden yellow shades and is very resistant to discharging agents. Similar valuable dyestuffs may be obtained from other p-hydroxy-amines of the benzene series, for example 3-methyl-4-hydroxy-1-amino-benzene, and from other 1-aryl-3-methyl-5-pyrazolones of the benzene series, for example 1-p-tolyl-3-methyl-5-pyrazolone and 1-o-methoxyphenyl-3-methyl-5-pyrazolone.

The following examples illustrate the invention:—

*Example 1.—To prepare p-hydroxybenzene-azo-1-phenyl-3-methyl-5-pyrazolone*

5.5 parts of p-aminophenol are dissolved in 80 parts of water and 17 parts of hydrochloric acid (32%) and 30 parts of broken ice added. 3.6 parts of sodium nitrite, dissolved in 10 parts of water are then added to effect diazotization. This diazo solution is then run slowly into a solution of 9 parts of 1-phenyl-3-methyl-5-pyrazolone in 80 parts of water containing 2 parts of caustic soda, alkalinity being maintained by addition of 20% soda ash solution. When coupling is complete the dyestuff is collected by filtration, washed well, and retained suitably as an aqueous paste. Applied to cellulose acetate fibres it gives a full golden yellow colour, which shows excellent resistance to discharge by the usual reduction methods.

*Example 2.—To prepare 3-methyl-4-hydroxybenzene-azo-1-phenyl-3-methyl-5-pyrazolone*

6.2 parts of 3-methyl-4-hydroxy-1-aminobenzene are taken for the 5.5 parts of p-aminophenol mentioned in Example 1, diazotization and subsequent coupling with phenylmethylpyrazolone being effected as detailed in Example 1. Shade and properties of the dyestuff are very close to those of the product of Example 1.

*Example 3.—To prepare p-hydroxybenzene-azo-1-paratolyl-3-methyl-5-pyrazolone*

The preparation is effected as in Example 1 except that 9.5 parts of 1-p-tolyl-3-methyl-5-pyrazolone are substituted for the 9 parts of phenylmethylpyrazolone therein used.

Having described my invention what I desire to secure by Letters Patent is:—

1. Para-hydroxy-benzene-azo-1-phenyl-3-methyl-5-pyrazolone.
2. Para-hydroxy-benzene-azo-1-para-tolyl-3-methyl-5-pyrazolone.
3. 3-methyl-4-hydroxy-benzene-azo-1-phenyl-3-methyl-5-pyrazolone.
4. A pyrazolone azo dye of the formula

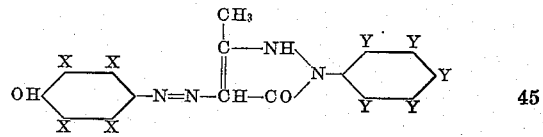

wherein one X represents hydrogen or methyl and the others represent hydrogen, and one Y represents hydrogen, methyl or methoxy and the others represent hydrogen.

GEORGE HOLLAND ELLIS.